Figures 1, 2:
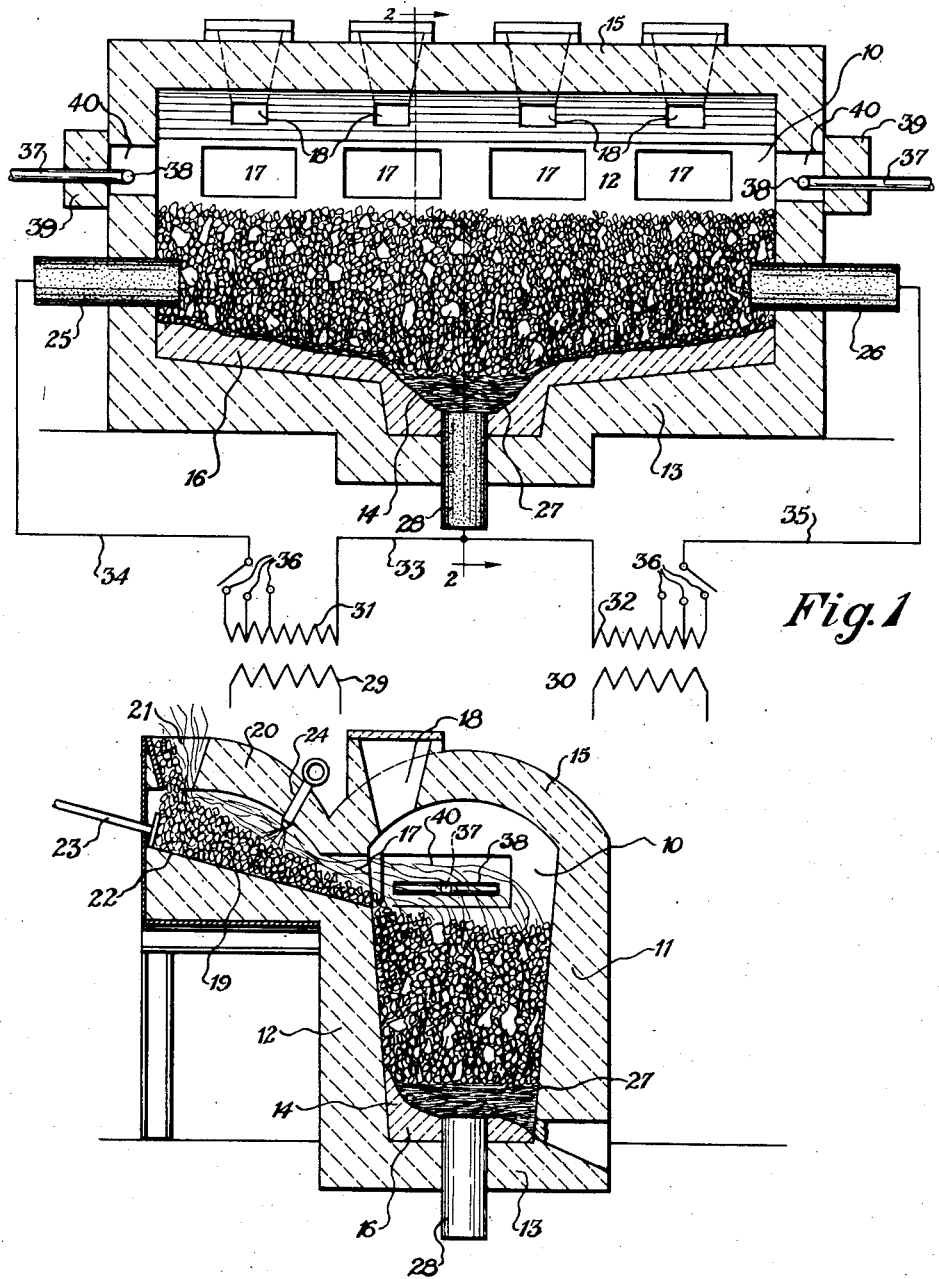

Aug. 30, 1932.　　　T. F. BAILY　　　1,874,417

ELECTRIC FURNACE

Original Filed Aug. 28, 1929

Inventor
Thaddeus F. Baily
By Harry Frease
Attorney

Patented Aug. 30, 1932

1,874,417

UNITED STATES PATENT OFFICE

THADDEUS F. BAILY, OF ALLIANCE, OHIO

ELECTRIC FURNACE

Application filed August 28, 1929, Serial No. 388,982. Renewed June 14, 1932.

The invention relates to electric furnaces of the resistance type and more particularly to a horizontal furnace adapted for the melting or carburizing of metals and the reduction of ores and other oxides.

The objects of the improvement are to provide a furnace in which the charge of metal or oxide and coke itself forms a resistor through which the current is passed for carrying out the melting or reducing operations; to produce a horizontal furnace in which the electric current is passed longitudinally through the charge at right angles to the flow of the molten material; to provide for preheating or melting the ores or oxides by waste gas from the main furnace chamber mixed with air; to provide a furnace in which the distance between any two electrodes is considerably greater than the cross sectional area of the furnace; to provide for leveling the charge after it is placed in the furnace; to provide for charging at one side of the furnace; and to provide for convenient control of the power input by varying the voltage to the furnace.

The above and other objects may be attained by constructing a horizontal furnace of considerably greater length than its width, tapered in cross section from top to bottom, the bottom of the furnace chamber being sloped from both ends toward the center, at which point there is a depression or basin for holding the molten metal, an electrode being located at each end of the furnace, in contact with the charge, and a third electrode being located in the depression or basin for contact with the molten metal.

Charging openings are located at the side of the furnace, above the line of the charge, for charging metal or oxides into the furnace, and one or more openings are provided in the roof upon the same side as the charging openings for charging other raw material such as coke or other suitable reducing agent.

If desired, preheaters may be associated with the charging openings at the side of the furnace for charging the metal or oxides and if desired, either metal or oxide and coke or other reducing agent may be charged through alternate charging openings.

Air may be fed into the preheaters to mix with the conbustible gases from the melting or reducing operation for preheating or melting the charge before it enters the main chamber of the furnace.

Means may be provided for either mechanically or manually operating a leveling bar from one or both ends of the furnace for leveling the charge within the main chamber of the furnace, these leveling bars being pulled back into recessed openings in the brickwork when not in use and being so arranged as to provide a substantially gas-tight fit at these points.

An embodiment of the invention thus set forth in general terms is illustrated in the accompanying drawing, in which Figure 1 is a longitudinal vertical section through the improved furnace; and Fig. 2, a transverse section through the same taken substantially on the line 2—2, Fig. 1.

Similar numerals refer to similar parts throughout the drawing.

The main chamber of the furnace, in which the melting or reducing operation may be carried on is indicated generally at 10 and as illustrated in the drawing, is an elongated, substantially horizontal chamber, of considerably greater length than its width, the side walls 11 and 12 being tapered toward the bottom and the bottom wall or hearth 13 being sloped from both ends toward the center where the depression or basin 14 is provided for receiving the molten metal. A tap hole may be provided in the lowest portion of the basin, as shown in Fig. 2.

The roof 15 may be arched as illustrated, the entire structure being built of fire brick or the like and the bottom of the chamber lined with $Al_2O_3$ or other suitable material, as indicated at 16.

One or more charging openings 17 may be provided in the side wall 12, above the level of the charge in the furnace and the metal or oxide may be charged therein while other raw material such as coke or other reducing agent may be charged through openings 18 in the roof located adjacent to the charging opening 17.

If desired, metal or oxide and coke may be charged through alternate openings 17 and the roof openings 18 may be dispensed with. In such a case, the number of the charging openings 17 should be such that coke may be charged through the opening at each end of the furnace.

Preferably a preheater is associated with each charging opening 17 for preheating or melting the oxide or metal before it enters the furnace chamber.

Each of these preheaters may be provided with the inclined bottom wall 19 and the arched roof 20, a charging opening 21 being formed in the roof at the outer end of the preheater for charging oxide or the like, as indicated at 22.

A pusher 23 may be provided for feeding the preheated or melted material from the preheater into the main furnace chamber 10.

The preheater is so constructed that combustible gases from the chamber 10 may pass through the preheater, mixing with air which may be admitted as by the pipe 24 for burning the gases to carry on the preheating or melting operation.

The charge of metal or oxide and coke may thus be charged into the furnace chamber so as to be mixed together or alternate layers of oxide or metal and coke may be charged if desired.

The melting or reduction is carried on by passing electric current through the charge from one end of the furnace to the other, between the electrodes 25 and 26, the charge itself forming a resistor which produces the necessary temperature to melt or reduce the same.

The electric current thus passes horizontally in a longitudinal path through the furnace chamber at right angles to the descending molten metal in the charge. This molten metal collects in the depression or basin 14 as indicated at 27 and may be maintained molten by contact with the electrode 28 which may be electrically connected to the other electrodes, as shown in Fig. 1.

The transformer is provided with the primary coils 29 and 30 and the secondary coils 31 and 32, both of which are connected as by the wire 33, with the electrode 28.

The secondary coil 31 may be connected by a wire 34 with the electrode 25 and the secondary coil 32 may be connected by the wire 35 with the electrode 26.

For the purpose of varying the voltage of the furnace in order to provide for convenient control of the power input, each of the secondary coils of the transformer may be provided with a plurality of taps 36 to any one of which the wires 34 and 35 may be selectively connected.

For the purpose of leveling the charge within the furnace, leveling bars 37, provided with crossheads 38, may extend longitudinally through one or both ends of the furnace.

These bars may be operated either manually or by any suitable mechanism and in order to provide a gas-tight fit, each leveling bar may be slidably located through a block 39 of fire brick or the like. When not in use the leveling bars are arranged to be pulled back into the recesses 40, at the ends of the furnace, as best shown in Fig. 1 of the drawing.

By charging the material at the side of the furnace, an advantage is obtained in that a stronger roof structure is produced and the total height of the furnace is kept down to a minimum, allowing a wider variation in the amount of material being preheated or melted at one time and providing a more convenient arrangement for the combustion chamber.

Another advantage of this type of furnace over other types, in the melting of metals or reduction of oxides, is the elimination of electrode moving mechanism.

Furthermore, it will be seen that the electrodes are always under a reducing atmosphere, eliminating oxidation on the inside of the furnace and since no arc is created, due to the constant contact of the electrodes with the charge, electrode consumption is greatly reduced.

This type of furnace also provides ready, convenient, and efficient means for utilizing the combustible waste gases produced by the reactions in the reduction or melting operations.

It will be seen that by sloping the hearth or bottom of the furnace toward the center, the metal as it melts will quickly be carried away from the path of the current and thus kept from carrying current.

By locating the electrodes 25 and 26 in the lower part of the charge it will be seen that as soon as the charge becomes metallized it flows to the basin 14 where it will not carry current unless the electrode 28 is energized.

The hottest zone of the furnace is thus at the bottom, giving more effective preheating than would be obtained by locating the electrodes higher in the charge and passing the current through the new fresh charge. This construction also keeps the bottom hotter, thus tending to maintain the metal molten.

I claim:

1. An electric furnace having an elongated, horizontal chamber adapted to receive a charge containing carbon, and an electrode at each end of and extending only slightly into the furnace arranged to contact with the charge whereby substantially the entire charge becomes an electric resistor before becoming molten.

2. An electric furnace having an elongated, horizontal chamber adapted to receive a charge containing carbon, means for charging material at one side of the chamber, and an electrode at each end of and extending only slightly into the furnace arranged to contact with the charge whereby substantially the entire charge becomes an electric resistor before becoming molten.

3. An electric furnace having an elongated, horizontal chamber adapted to receive a charge containing carbon, means for preheating material by waste gases from the chamber and for charging the preheated material at one side of the chamber, and an electrode at each end of and extending only slightly into the furnace arranged to contact with the charge whereby substantially the entire charge becomes an electric resistor before coming molten.

4. An electric furnace having an elongated, horizontal chamber adapted to receive a charge containing carbon, means for charging material at one side of the chamber, an electrode at each end of and extending only slightly into the furnace arranged to contact with the charge whereby substantially the entire charge becomes an electric resistor before becoming molten, and means for leveling the charge in the chamber.

5. An electric furnace having an elongated, horizontal chamber adapted to receive a charge containing carbon, an electrode at each end of the furnace arranged to contact with the charge whereby substantially the entire charge becomes an electric resistor before becoming molten, a basin at the center of the bottom of the chamber for receiving molten metal, and a third electrode at the bottom of said basin.

6. An electric furnace having an elongated, horizontal chamber adapted to receive a charge containing carbon, means for charging material at one side of the chamber, an electrode at each end of the furnace arranged to contact with the charge whereby substantially the entire charge becomes an electric resistor before becoming molten, and means at the end of the chamber for leveling the charge therein.

7. An electric furnace having an elongated, horizontal chamber adapted to receive a charge containing carbon, means for charging material at one side of the chamber, an electrode at each end of the furnace arranged to contact with the charge whereby substantially the entire charge becomes an electric resistor before becoming molten, and means for charging additional material through the top of the chamber.

8. An electric furnace having an elongated, horizontal chamber adapted to receive a charge containing carbon, means for charging material at one side of the chamber, an electrode at each end of the furnace arranged to contact with the charge whereby substantially the entire charge becomes an electric resistor before becoming molten, and means for charging additional material through the top of the chamber and at the same side thereof.

9. An electric furnace having an elongated, horizontal chamber adapted to receive a charge containing carbon, an electrode at each end of the furnace arranged to contact with the charge whereby substantially the entire charge becomes an electric resistor before becoming molten, and means for varying the voltage to said electrodes.

10. An electric furnace having an elongated, horizontal chamber adapted to receive a charge containing carbon, an electrode at each end of the furnace arranged to contact with the charge whereby substantially the entire charge becomes an electric resistor before becoming molten, a basin at the center of the bottom of the chamber for receiving molten metal, a third electrode in said basin, and means for varying the voltage to said electrodes.

11. An electric furnace having an elongated, horizontal chamber adapted to receive a charge containing carbon, an electrode at each end of the furnace arranged to contact with the charge whereby substantially the entire charge becomes an electric resistor, a leveling bar slidably located through one end of the chamber, and means for forming a gas-tight seal around the leveling bar.

12. An electric furnace having an elongated, horizontal chamber adapted to receive a charge containing carbon, an electrode at each end of the furnace arranged to contact with the charge whereby substantially the entire charge becomes an electric resistor, a leveling bar slidably located through one end of the chamber, and a recess in the furnace end wall for receiving the leveling bar when not in use.

13. An electric furnace having an elongated, horizontal chamber adapted to receive a charge containing carbon, an electrode at each end of the furnace arranged to contact with the charge whereby substantially the entire charge becomes an electric resistor before becoming molten, and a basin at the center of the bottom of the chamber for receiving molten metal.

14. An electric furnace having an elongated, horizontal chamber adapted to receive a charge containing carbon, an electrode at each end of the furnace arranged to contact with the charge whereby substantially the entire charge becomes an electric resistor before becoming molten, the bottom of the chamber sloping from both ends toward the center, and a tap hole at the center of the bottom.

15. An electric furnace having an elongated, horizontal chamber adapted to receive a charge containing carbon, an electrode at each end of and extending only slightly into the furnace arranged to contact with the charge whereby substantially the entire charge becomes an electric resistor before becoming molten, an inclined preheating hearth at one side of and communicating with the furnace chamber for preheating a part of the charge.

16. An electric furnace having an elongated, horizontal chamber adapted to receive a charge containing carbon, an electrode at each end of and extending only slightly into the furnace arranged to contact with the charge whereby substantially the entire charge becomes an electric resistor before becoming molten, an inclined preheating hearth at one side of and communicating with the furnace chamber for preheating a part of the charge, and means for advancing material forward upon the inclined preheating hearth.

17. An electric furnace having an elongated, horizontal chamber adapted to receive a charge containing carbon, an electrode at each end of and extending only slightly into the furnace arranged to contact with the charge whereby substantially the entire charge becomes an electric resistor before becoming molten, a preheating hearth at one side of and communicating with the furnace chamber for preheating a part of the charge, and means for advancing material forward upon the preheating hearth.

18. An electric furnace having an elongated, horizontal chamber adapted to receive a charge, means for mixing a charge of carbon and metal in the furnace chamber and an electrode at each end of the furnace arranged to contact with the charge whereby substantially the entire charge becomes an electric resistor before becoming molten.

19. An electric furnace having an elongated, horizontal chamber tapered from top to bottom in cross section and adapted to receive a charge containing carbon, and an electrode at each end of the furnace near the bottom of the chamber arranged to contact with the charge whereby substantially the entire charge becomes an electric resistor before becoming molten.

In testimony that I claim the above, I have hereunto subscribed my name.

THADDEUS F. BAILY.